July 15, 1941.  H. P. SMITH  2,249,640

LIFTING CONNECTION FOR TRACTOR IMPLEMENTS

Filed March 26, 1940  3 Sheets-Sheet 1

INVENTOR
Hiram P. Smith
By Paul O. Pippel
ATTY.

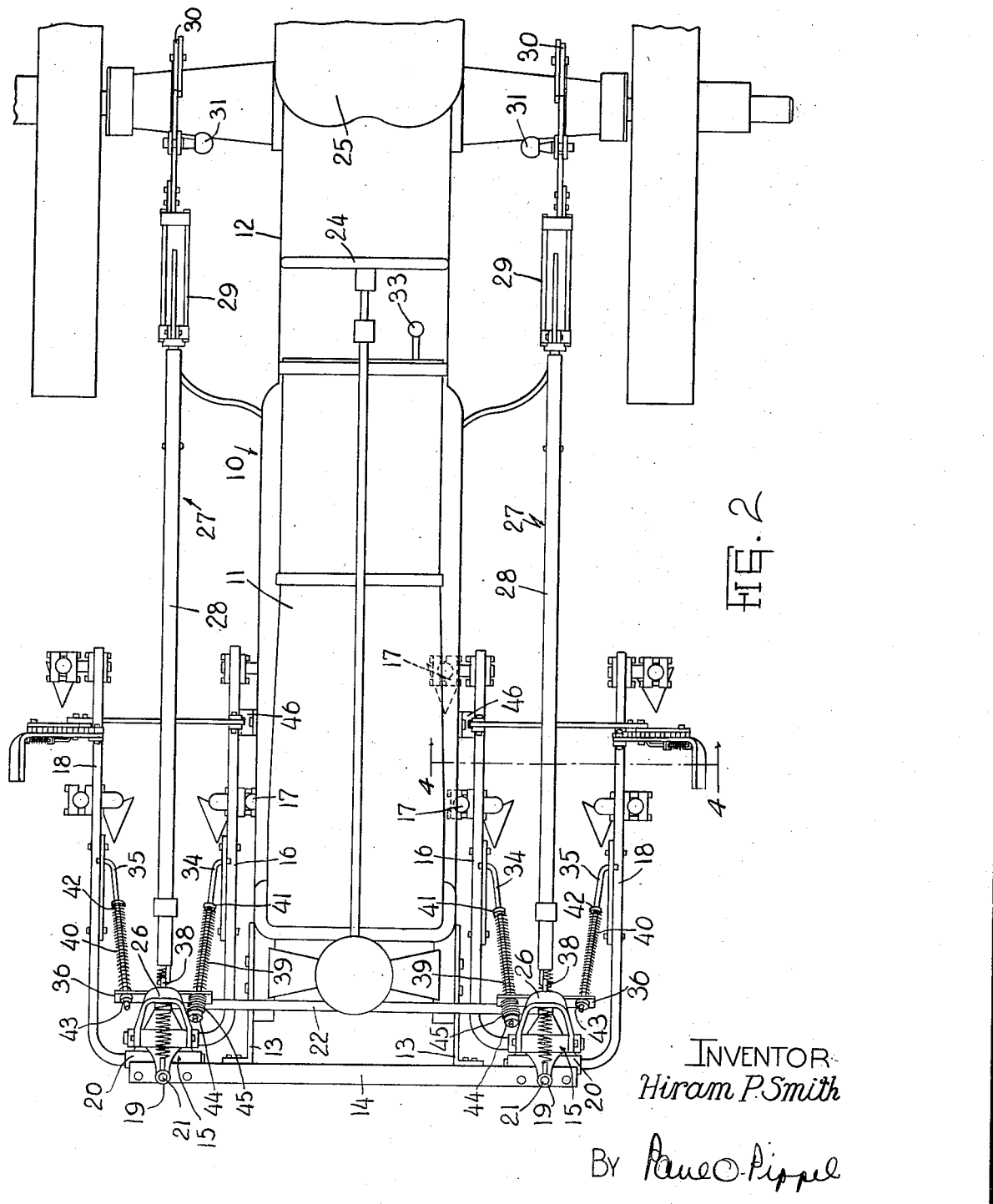

July 15, 1941.  H. P. SMITH  2,249,640
LIFTING CONNECTION FOR TRACTOR IMPLEMENTS
Filed March 26, 1940  3 Sheets-Sheet 3
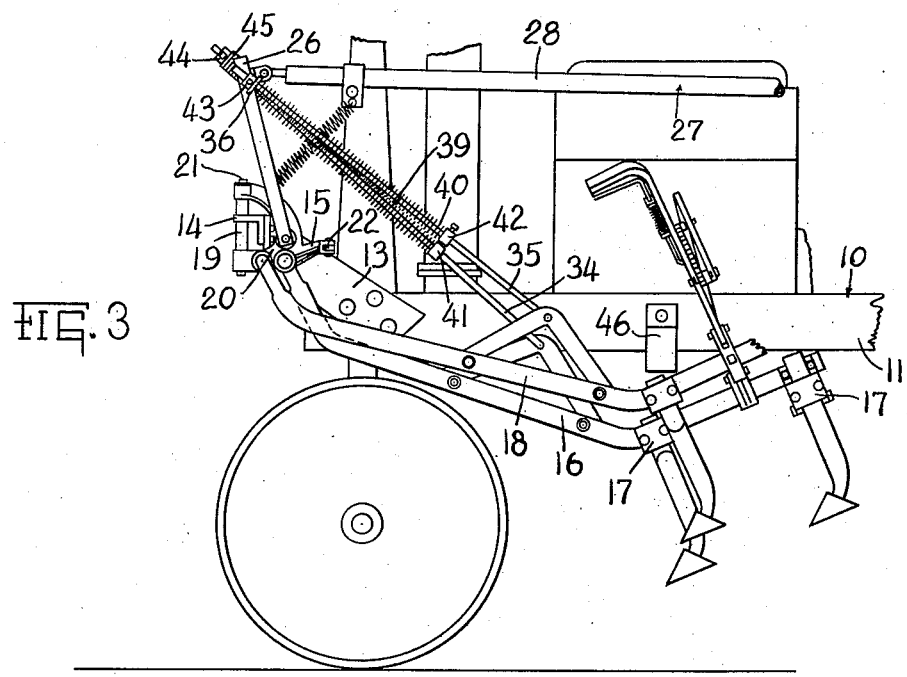
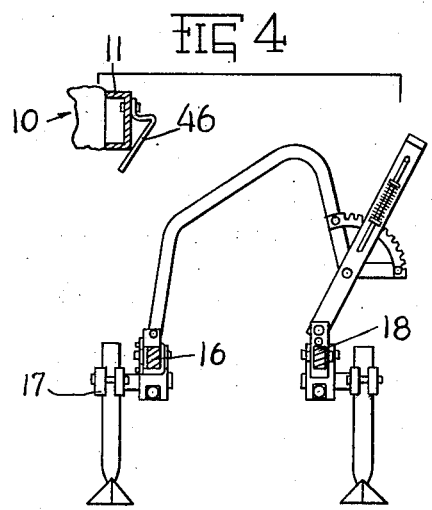
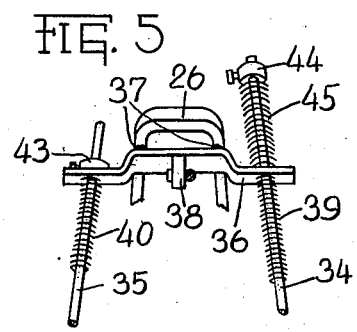
INVENTOR
Hiram P. Smith
BY Paul O. Pippel
ATT'Y.

Patented July 15, 1941

2,249,640

UNITED STATES PATENT OFFICE 2,249,640

LIFTING CONNECTION FOR TRACTOR IMPLEMENTS

Hiram P. Smith, Canton, Ill., assignor to International Harvester Company, a corporation of New Jersey Application March 26, 1940, Serial No. 326,064

8 Claims. (Cl. 97—50)

This invention relates to tractor mounted implements, and more particularly to the lifting connections for the same.

It is an object of this invention to provide in the lifting connections a resilient or yieldable means whereby the movement of the rig may be interrupted upon engagement with the under portion of the tractor without damage to the means for lifting the implement.

It is another object of the invention to provide lifting connections for one of the rigs of a set which happens to have portions extending under the tractor for engagement therewith upon vertical movement, whereby continued movement of the other rig of the set may be had independently of the rig which engages the under portion of the tractor.

According to the present invention, there has been provided in the lifting connections, and particularly associated with the lifting rod connected with the rig which may engage the tractor upon vertical movement, a yieldable spring means strong enough to normally support the weight of the rig but weak enough to yield upon engagement of the rig with the tractor.

For a better understanding of the invention, reference may be had to the following detail description taken in connection with the accompanying drawings, in which:

Figure 2 is a plan view of the same tractor showing the position of the rigs at each side of the tractor;

Figure 3 is a view in elevation of a portion of the tractor and implement shown in Figure 1, but with the implement moved to a lifted position;

Figure 1:
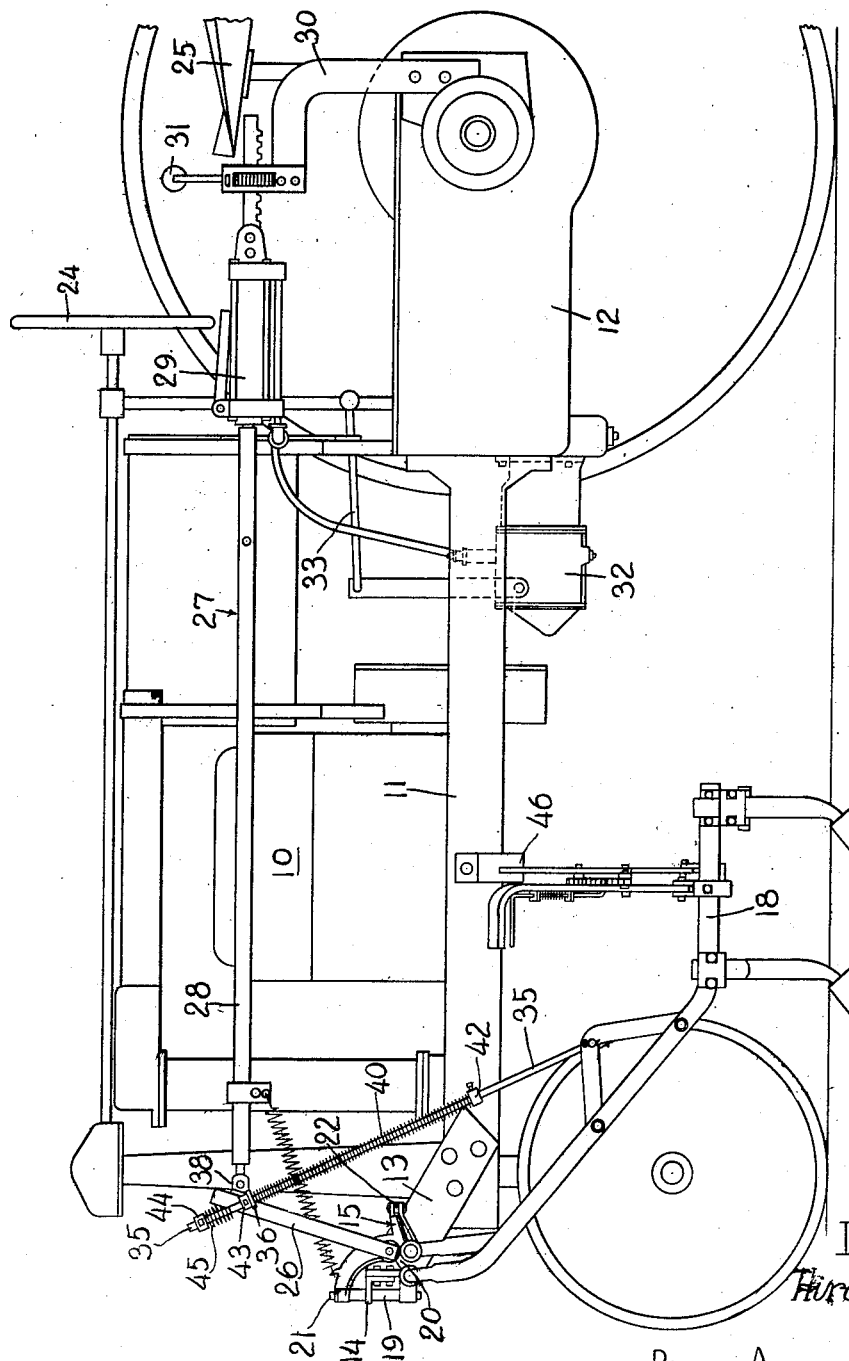
Figure 1 is a view in elevation of a tractor with a cultivating attachment connected thereto and associated with the lifting connections for lifting of the cultivator rig relative to the tractor.

Figure 4 is a vertical detail view taken along the line 4—4 of Figure 2, and illustrates the spacing means for maintaining the rear portions of the rigs in a definite setting, and the relation of the rigs to the edge of the narrow body portion of the tractor; and, Figure 5 is a view somewhat in detail and showing particularly the location of the yieldable means on the cultivator lift rod, there being only such yieldable means for the cultivator rig which extends under the tractor.

Referring now to Figures 1, 2, and 3, there is shown a tractor 10 having a narrow, longitudinally extending body portion 11 and a transmission and differential housing portion 12. On the forward part of the narrow body portion 11 are located brackets 13 for the supporting of a transversely extending supporting means 14 that extends relatively laterally from the sides of the narrow body portion 11 and is located somewhat forwardly thereof. The particular type of cultivating attachment shown herein is of the shifting rig type, wherein the cultivator rigs are pivoted through a bracket 15 for lateral swinging movement, the bracket in turn being laterally adjustable on the transversely extending supporting means 14 to adjust the respective set of the rigs for different row adjustments. Particularly with the narrow row adjustment setting of these sets of rigs, there is a greater tendency for the rig nearest to the narrow body portion to have portions which extend under the body of the tractor for engagement with the same upon moving of the rig to a lifted position. The description will now be directed to one of the sets of rigs at the one side of the tractor. It shall be understood, however, that the set of rigs on the opposite side of the tractor is similar.

A rig 16, located nearest to the tractor, has portions 17 extending under the body portion of the tractor as shown in Figure 2, while an outer rig 18, also located therewith, is free of the tractor upon vertical movement. These rigs are respectively pivoted to the bracket 15. This bracket 15 comprises two parts, a vertically-extending part 19, which is directly connected to the transversely extending member 14, and a part 20 to which the rigs 16 and 18 are pivoted for independent vertical movement. The part 20 is shiftable laterally with respect to the part 19 about a vertical pivot 21. Connected to the movable part 20, to make the lateral shifting of the sets of rigs responsive to steering of the tractor, is a connecting member 22 adapted to be operated by the steering mechanism 24 from the operator's station 25. By arrangements well known in the art, this steering mechanism is only effective to steer the rigs when the rigs are in their ground-working position. Thus, the rigs are released from the steering mechanism upon being moved to a lifted position, thereby leaving them more or less free to swing laterally as they are being moved to the lifted position.

Located on the part 20 of the bracket 15 and pivotally connected thereto is a lifting lever 26 movable fore and aft with respect to the body portion of the tractor and about an arc. This lifting lever 26 forms part of a means 27 for moving rigs to a lifted position, which means is only generally shown. The lifting means 27 includes further a fore and aft movable lifting pipe 28 connected to the upper end of the lever 26 and adapted to be moved fore and aft by a hydraulic cylinder 29 located, as shown. This hydraulic cylinder 29 is adjustably connected to a vertically upstanding bracket 30. When the depth adjustment of the rigs is desired, the cylinder 29 and the connections with the rig are moved bodily relative to the tractor by means of a manual adjusting mechanism 31. To supply power for the operation of the hydraulic cylinder 29, there is provided a fluid pump 32 adapted to be driven by connection with the gearing within the transmission housing 12. Also associated with the pump 31 is control mechanism adapted to be operated by a control lever 33 accessible to the operator's station 25. When lifting movement of the cylinder 29 is desired, the operator will move the control lever 33 to a position to effect lifting. The hydraulic mechanism including the pump 32 and the hydraulic cylinder 29 is of the type shown in pending application of A. C. Lindgren and Carl W. Mott, Serial No. 181,778, filed December 27, 1937.

Connecting respectively the rigs 16 and 18 with the pivoted lever 26 are the lift rods 34 and 35. Referring particularly to Figure 5, it will be noted that these lift rods pass through holes in a laterally extending plate 36 rigidly secured to the upper end of the lever 26 by welding, as indicated at 37. The plate 36, it will be noted, is so connected to the lever 26 that the lower face of the same will be at right angles generally to the axis of the lift rods. The fore and aft movable rod 28 may, in turn, be connected to this plate member 36, as indicated at 38.

Associated respectively with these lift rods are the usual pressure rod springs 39 and 40. These springs surround the rods and abut the lower faces of the plate member 36, and push downwardly against the collars 41 and 42, respectively, in a manner well known to maintain the respective rigs in their ground-working position.

On the upper end of the rod 35 is located the lifting collar 43. As the lifting lever 26 moves forwardly, the lifting collar 43 is abutted by the upper face of the plate member 36 to effect lifting of the rig 18.

Coming now to the particular feature of the present invention, it will be seen that the rod 34 is longer than the rod 35 and is supplied, in addition to a lifting collar 44, with a yieldable or resilient spring means 45 associated with the rod 34 and between the collar 44 and the upper face of the plate 36. This yieldable means 45 is sufficiently strong to carry the weight of the rig, but, when the rig strikes the under portions of the tractor, the same will yield, thereby permitting continuous movement of certain of the lifting connections and of the rig 18 independently of further movement of the rig 16. Referring particularly to Figure 3, it will be noted that, when the rigs are moved to this raised position, the rig 18 is moved to a position higher than the rig 16. Thus, continued movement of the rig 18 is permitted after the movement of the rig 16 has been interrupted.

Merely as a means to deflect the rig 16 from the body portion of the tractor, there is provided a deflecting plate 46, but this means is very often insufficient for deflection of the rig away from the under portion of the tractor during the lifting operation. For different settings of the rigs transversely of the tractor and of different depth adjustment settings, it has been necessary to provide the yieldable means 45 to assure that the lifting connections are not too greatly stressed by the engagement of the rig 16 with the under portion of the tractor.

With maximum depth settings of the cultivator rigs, there may be seldom a time at which the yieldable means 45 will be brought into action, all, of course, depending upon the tractor clearances. Since the hydraulic means 29 has a definite forward stroke, this stroke is not of such length as to cause striking of the implements against the under portion of the tractor when the same is operated to effect lifting of them. But, in the more shallow depth settings of the rigs, there is the possibility that the rig 16 will engage with the under portion of the tractor. Thus, it is particularly necessary, with these shallow depth settings, that the yielding means 45 be provided.

While various changes may be made in the detail construction of the arrangement, it shall be understood that such changes snall be within the spirit and scope of the appended claims.

What is claimed is:

1. In combination, a tractor having a body portion, a set of soil-tilling rigs, each of which is connected to the tractor for independent vertical movement but one of the same having portions which extend under the body portion of the tractor to engage the same upon being moved to a lifted position, means for vertically moving all of the rigs of the set together to a lifted position, said moving means including connections with each of the rigs but the connections to the rig having portions which extend under the tractor including yieldable means to permit interruption of movement of the rig upon engaging the tractor and to allow continued movement of the other rig of the set.

2. In combination, a tractor having a narrow longitudinally extending body portion, supporting means on the body portion and extending laterally from the same, a set of soil-tilling rigs extending along the sides of the narrow body portion, each of which is pivoted to said supporting means for independent vertical movement, but the rig nearest to the tractor having portions which extend under the tractor to engage the same upon vertical movement, means for vertically moving all of the rigs of the set together to a lifted position, said moving means including connections with each of the rigs but the connections to the rig having portions which extend under the tractor having yieldable means to permit interruption of movement of the rig upon engaging the tractor and to allow continued movement of the other rig of the set.

3. In combination, a tractor having a body portion, a set of soil-tilling rigs, each of which is connected to the tractor for independent vertical movement with respect to the same but one of the same having portions which extend under the body portion of the tractor to engage the same upon being moved to a lifted position, lifting means for moving the rigs including a lifting lever pivotally connected to the tractor for vertical movement about an arc, a lift rod for each rig to connect the same respectively to the lifting lever, and yieldable means associated with the lift rod conecting with the rig which has portions extending under the tractor, whereby the vertical movement of that rig may be interrupted upon engagement of the same with the tractor while movement of the other of the set of rigs may continue.

4. In combination, a tractor having a narrow longitudinally extending body portion, supporting means on the body portion and extending laterally from the same near the front of the tractor, a set of cultivating rigs extending along the sides of the narrow body portion, each of which is pivoted to said supporting means for independent vertical movement but the rig nearest the tractor having portions which extend under the tractor to engage the same upon vertical movement, lifting means for moving the rigs including a lifting lever pivotally mounted on said supporting means for fore and aft movement about an arc, a lift rod for each rig to connect the same respectively to the lifting lever, and yieldable means associated with the lift rod which connects with the rig nearest to the tractor, whereby vertical movement of that rig may be interrupted upon engagement of the same with the tractor while movement of the other of the set of rigs may continue.

5. In combination, a tractor having a body portion, a soil-tilling rig connected to the tractor for vertical movement to a lifted position, power means deriving power from the tractor for lifting the rig including connections with the same, means for bodily adjusting the power means and its connection to effect depth adjustment of the rig, said rig being so located on the tractor as to have portions which in certain of the depth adjustments of the same may engage the under portion of the tractor, and yieldable means in the power connections to permit interruption of the movement of the rig upon engagement with the under portion of the tractor.

6. In combination, a tractor having a body portion, supporting means on the body portion, a set of cultivator rigs extending along the sides of the body portion, each of which is pivoted to said supporting means for independent vertical movement but the rig nearest to the body portion of the tractor having portions which extend under the tractor to engage the same upon vertical movement, lifting means for moving the rigs including relatively movable parts and a lift rod for each of the rigs respectively for connecting the same to the movable parts, the lift rod for the rig having portions extending under the tractor being longer than the lift rod for the other of said rigs and extending through the movable parts to a greater distance, yieldable spring means associated with extended portions of the rod and connecting the same with the movable parts, whereby vertical movement of that rig may be interrupted upon engagement of the same with the tractor while movement of the other of the set of rigs may continue.

7. In combination, a tractor having a body portion, supporting means on the body portion, a set of cultivator rigs extending along the sides of the body portion, each of which is pivoted to said supporting means for independent vertical movement but the rig nearest to the body portion of the tractor having portions which extend under the tractor to engage the same upon vertical movement, lifting means for moving the rigs including relatively movable parts and a lift rod for each of the rigs respectively for connecting the same to the movable parts, the lift rod for the rig having portions which extend under the tractor in its connection with the movable parts extending through the same to a greater distance to provide a longer rod, and a yieldable spring means associated with the extended part of said rod, said spring means being of sufficient strength to normally support the weight of said rig but yieldable upon engagement of the same with the tractor to permit the vertical movement of the same to be interrupted while movement of the other of the set of rigs may continue.

8. In combination, a tractor having a body portion, a soil-tilling rig connected to the tractor for vertical movement to a lifted position, power means deriving power from the tractor for lifting the rig including connections with the same, means for adjusting the rig for depth, said rig being so located on the tractor as to have portions which in certain of the depth adjustments of the same may engage the under body portion of the tractor, and yieldable means in the power connections to permit interruption of the movement of the rig upon engagement with the body portion of the tractor.

HIRAM P. SMITH.